United States Patent [19]
McKee et al.

[11] 3,969,952
[45] July 20, 1976

[54] MIRROR ACTUATOR

[76] Inventors: Clyde M. McKee, 22175 Bernard St., Taylor, Mich. 48180; Ward Scott, 429 Rochdale Drive, Rochester, Mich. 48063

[22] Filed: Nov. 25, 1974

[21] Appl. No.: 526,794

[52] U.S. Cl. .............................................. 74/501 M
[51] Int. Cl.² .......................................... G05G 1/00
[58] Field of Search ................................. 74/501 M

[56] References Cited
UNITED STATES PATENTS

| | | | |
|---|---|---|---|
| 3,472,095 | 10/1969 | Kostin et al. | 74/501 M |
| 3,476,464 | 11/1969 | Clark | 74/501 M |
| 3,653,276 | 4/1972 | McIntyre et al. | 74/501 M |
| 3,724,928 | 4/1973 | Olsen | 74/501 M |

Primary Examiner—Benjamin W. Wyche
Assistant Examiner—Wesley S. Ratliff, Jr.
Attorney, Agent, or Firm—Gifford, Chandler & Sheridan

[57] ABSTRACT

A mirror actuator for trucks whereby the mirror may be adjusted from a position adjacent the seat of the driver to provide maximum visibility from the right hand mirror. A lever is positioned in the truck adjacent the seat of the driver so that the lever may be actuated by the driver while the driver remains in the driving position. The lever in turn controls a cable which is secured to the exterior right hand mirror assembly so that actuation of the lever will cause a corresponding pivotal movement of the right hand exterior mirror about its vertical center line.

3 Claims, 2 Drawing Figures

MIRROR ACTUATOR

BACKGROUND OF THE INVENTION

I. Field of the Invention

The present invention relates to right hand exteriorly mounted rear view mirrors for trucks and, more particularly, to means for adjustably positioning the right hand mirror for maximum visibility.

II. Description of the Prior Art

Modern day trucks, and particularly truck trailer combinations, are typically provided with externally mounted left hand and right hand rear view mirrors. The combination of the left hand and right hand rear view mirrors provide adequate rear view vision for the driver during many operating conditions such as, for example, highway cruising. The conventional previously known external mirrors for a truck are typically rigidly mounted to the truck by struts extending from the truck frame. Thus, for different drivers, the mirrors often must be adjusted prior to the departure of the truck.

Although the rigidly mounted exterior mirrors have proven sufficient for highway cruising, such mirrors have been found to be quite inadequate when turning the truck particularly when a right hand turn is executed. During a right hand turn, the truck is skewed relative to the trailer or trailers and because of this the driver in his normal operating position receives only a view of the side of his trailers from his right hand exterior mirror. In order to compensate for this totally inadequate rear view right hand view, truck drivers have heretofore been known to adjust their driving position, crane their necks, and the like in order to obtain an adequate rear view of the truck. Needless to say, such actions and movements by truck drivers are not only difficult for the truck drivers but also distract the truck drivers, thus creating a safety hazard.

SUMMARY OF THE INVENTION

The present invention eliminates the above mentioned disadvantages of the previously known truck rear view mirrors by providing an exteriorly mounted right hand rear view mirror for a truck being pivotally adjustably around a vertical center line. The pivotal position of the right hand mirror is controlled by a lever and cable assembly. The lever is mounted inside the truck at a position adjacent the truck driver so that the driver may actuate the lever from his normal driving position. The cable is secured to the lever at one end and at its other end to the right hand mirror so that actuation of the lever will cause a pivotal movement of the mirror via the cable. Thus, as will be more fully hereinafter explained, the driver will be able to obtain an adequate rear view from the right hand mirror by the appropriate adjustment of the lever during a right hand turn of the truck or the like.

BRIEF DESCRIPTION OF THE DRAWINGS

The mirror actuator of the present invention will be more clearly understood by reference to the following detailed description when read in conjunction with the attached drawing, wherein like reference characters refer to like parts throughout the several views, and in which.

DETAILED DESCRIPTION

Figure 1:
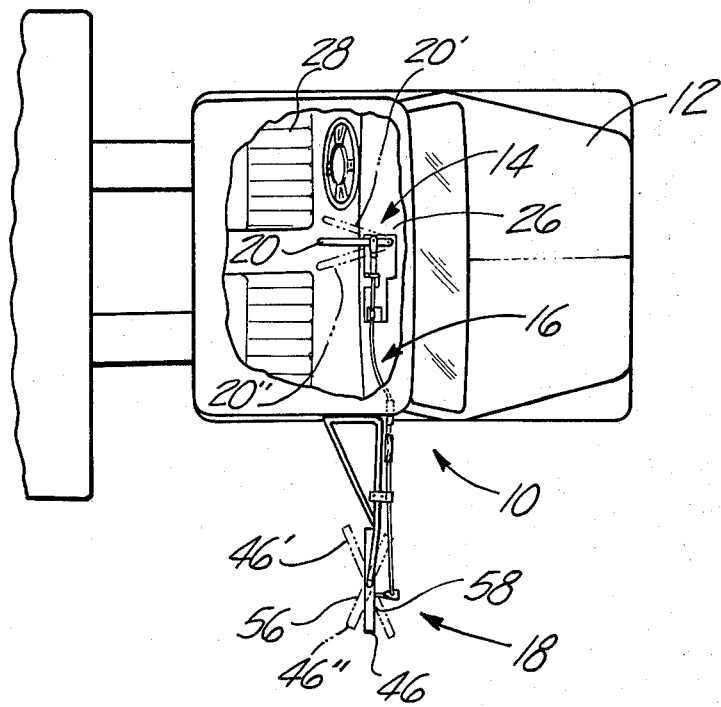
FIG. 1 is a top plan view showing the mirror actuator of the present invention installed in a truck.

The mirror actuator of the present invention, generally denoted by the number 10, is illustrated in FIG. 1 as installed on a truck 12. The mirror actuator 10 generally comprises three components, namely a lever assembly 14, a cable 16 and a mirror assembly 18.

Figure 2:
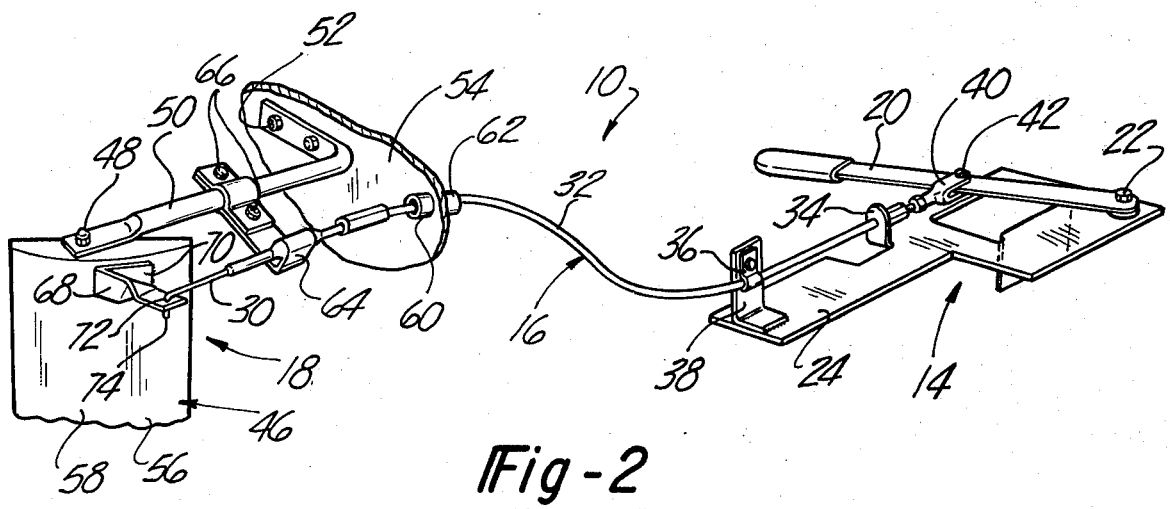
FIG. 2 is a perspective view of the mirror actuator of the present invention.

As can best be seen in FIG. 2, the lever assembly 14 comprises a lever 20 pivotally mounted by a pin 22 to a mounting bracket 24. The mounting bracket 24 is preferably mounted on the dash 26 (FIG. 1) of the truck 12 adjacent the seat 28 of the driver so that the driver may actuate the lever 20 without moving from his driving position.

The cable 16 is of the conventional type, having an inner wire member 30 and an outer sleeve 32 so that the wire 30 may axially slide relative to the sleeve 32. At one end of the cable 16, the cable extends through a tab member 34 on the mounting bracket 24 and the outer sleeve 32 is secured by a clamp 36 to a protruding frame flange 38 on the mounting bracket 24. In this manner, the outer sleeve 32 of the cable 16 is rigidly secured to the mounting bracket 24.

At the same end of the cable 16, the wire portion 30 axially protrudes from the end of the sleeve 32 and is secured to a U-shaped bracket 40. The bracket 40 in turn is pivotally secured to the lever 20 by a pin 42 which extends through registering apertures in the parallel legs of the U-shaped bracket 40 and the lever 20. The lever 20 is preferably disposed intermediate the parallel legs of the bracket 40. In addition, the pin 42 is preferably spaced apart from the pin 22. Thus, it can be seen that rotation of the lever 20 around the pivot pin 22 will cause the cable wire member 30, which is attached to the lever 20 by the bracket 40 to axially slide within the cable sleeve 32 which is secured to the mounting bracket 24 by the clamp 36.

Still referring to FIG. 2, the mirror assembly 18 generally comprises a mirror which is pivotally mounted by pins 48 to a pair of vertically spaced struts 50 (only one of which is shown). The struts 50 in turn are secured by bolts 52, or the like, to the door panel 54 of the truck 12. It will be appreciated that the mirror 46 typically comprises a rear reflective portion 56 (FIG. 1) and a forward metal housing 58 in which the reflective portion 56 is mounted.

The cable 16 extends through an aperture 60 formed in the door panel 54. A rubber insert 62 may be disposed within the aperture 60 to prevent the cable 16 from damage which might otherwise occur as the door is opened and closed. The outer sleeve 32 of the cable 16 is secured to one of the struts 50 by a bracket 64. The bracket 64 is secured to the strut 50 by any conventional means, such as bolts 66.

A forwardly projecting bracket member 68 is secured by welds 70, or the like, to the housing 58 of the mirror 46. An aperture 72 is formed vertically through the bracket 68 at a position horizontally spaced from the pivot pin 48, and is adapted to receive a hook 74 formed in the protruding end of the wire member 30 of the cable 16. It can thus be seen that the position of the bracket 68, and hence the rotational position of the mirror 46, is controlled by the axial position of the wire member 30 relative to the sleeve 32 of the cable 16. It will also be appreciated that any conventional means may be used to secure the wire portion 30 of the cable 16 to the bracket 68 without deviating from the spirit of the invention.

The operation of the mirror actuator of the present invention will now be described with particular reference to FIG. 1. With the lever 20 in its central position, the mirror 46 also assumes a central position. As the lever is shifted to the position indicated at 20', the wire member 30 will retract relative to the sleeve 32 and rotate the mirror 46 to the position indicated at 46'. Conversely, when the lever 20 is rotated in the opposite direction to the position indicated by 20'', the cable wire member 30 extends relative to the cable sleeve 32 and rotates the mirror 46 to the position shown at 46''.

Thus it can be seen that the rotational position of the mirror 46 may be readily adjusted by the lever 20 to provide the desired rear view for the driver from the right hand exterior mirror. Unlike previously known exteriorly mounted right hand truck mirrors, the mirror actuator 10 of the present invention may be simply and easily adjusted by shifting the lever 20 and without the necessity of the driver shifting from his normal driving position. The present invention thus provides maximum rear view visibility with a minimum of effort from the driver and also eliminates the previously mentioned safety hazard caused by drivers shifting from their driving position in an attempt to obtain rear view visibility.

Having thus described my invention, many modifications thereto will become apparent to those skilled in the art without deviating from the spirit of the invention as defined by the scope of the appended claims.

What is claimed is:

1. A mirror actuator for use in conjunction with an exteriorly mounted right hand rear view mirror on a vehicle, said mirror having a housing, said actuator comprising:
   a lever assembly having a mounting bracket for securing said lever assembly to said vehicle and an elongated lever having one end free and its opposite end pivotally mounted to said mounting bracket around a single axis of rotation;
   said mirror housing pivotally mounted only around a generally vertical axis of rotation by at least one support strut, said strut being also secured to said vehicle; and
   a single cable, said cable having an outer sleeve portion and an inner wire member, said sleeve being secured at one end to said mounting bracket and at its other end to said strut, said wire member being secured at one end to said lever at a point intermediate the free end and the pivotally mounted end of said lever and at its other end to a forwardly projecting second bracket secured to the housing of said mirror so that pivotal movement of said lever affects a corresponding pivotal movement of said mirror housing around its axis of rotation.

2. The mirror actuator defined in claim 1 wherein said mounting bracket is secured to the dash of said vehicle adjacent the driver's seat.

3. The mirror actuator defined in claim 2 wherein said struts are secured to the right hand door of said vehicle.

* * * * *